(12) United States Patent
Tong et al.

(10) Patent No.: US 8,942,697 B2
(45) Date of Patent: Jan. 27, 2015

(54) METHOD FOR UPLOADING NETWORK INFORMATION, AND USER EQUIPMENT, NETWORK SIDE EQUIPMENT AND SYSTEM THEREOF

(75) Inventors: Zhongrui Tong, Guangdong (CN); Xianzhou Zhang, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 67 days.

(21) Appl. No.: 13/812,771

(22) PCT Filed: Apr. 13, 2011

(86) PCT No.: PCT/CN2011/072723
§ 371 (c)(1),
(2), (4) Date: Jan. 28, 2013

(87) PCT Pub. No.: WO2012/016447
PCT Pub. Date: Feb. 9, 2012

(65) Prior Publication Data
US 2013/0122895 A1 May 16, 2013

(30) Foreign Application Priority Data

Aug. 3, 2010 (CN) .......................... 2010 1 0243975

(51) Int. Cl.
H04W 24/00 (2009.01)
H04W 24/02 (2009.01)
H04W 52/02 (2009.01)
H04L 29/08 (2006.01)

(52) U.S. Cl.
CPC .......... *H04W 24/02* (2013.01); *H04W 52/0212* (2013.01); *H04L 67/06* (2013.01); *H04L 67/12* (2013.01)

USPC ......... 455/423; 455/419; 455/425; 455/67.11

(58) Field of Classification Search
None
See application file for complete search history.

(56) References Cited

U.S. PATENT DOCUMENTS

| 2005/0186953 | A1* | 8/2005 | Harris ........................... 455/419 |
| 2010/0151851 | A1* | 6/2010 | Bhatia et al. .................. 455/425 |
| 2010/0197239 | A1* | 8/2010 | Catovic et al. ............. 455/67.11 |

FOREIGN PATENT DOCUMENTS

WO WO2005076838 A2 8/2005

\* cited by examiner

*Primary Examiner* — Erika A Washington
(74) *Attorney, Agent, or Firm* — Li & Cai Intellectuall Property (USA) Office

(57) ABSTRACT

The disclosure relates to a method for uploading network information, and User Equipment (UE), network side equipment and system thereof. The method comprises the following steps: a network side equipment receives power supply capacity information reported by a UE; the network side equipment instructs the UE to upload needed network information according to the power supply capacity information; the network side equipment receives the network information, which is uploaded by the UE. The method for uploading network information by using the power supply capacity information of UE, and UE, network side equipment and system thereof, according to example embodiments of the present invention, avoid the problems of short standby time and the interruption of ongoing service for a user caused by uploading the network information, and reduces the operation cost, by uploading the network information according to the power supply capacity of the UE.

11 Claims, 6 Drawing Sheets

METHOD FOR UPLOADING NETWORK INFORMATION, AND USER EQUIPMENT, NETWORK SIDE EQUIPMENT AND SYSTEM THEREOF

FIELD OF THE INVENTION

The present invention relates to the technical field of communications, and in particular to a method for uploading network information by using the power supply capacity information of User Equipment (UE), and UE, network side equipment and system thereof, in Long Term Evolution (LTE) system and Long Term Evolution Advanced (LTE-A) system.

BACKGROUND

In existing wireless communication systems, for ensuring the proper operation of a wireless network, the wireless network service providers need a large amount of data to evaluate network performance and make adjustment accordingly. The traditional Drive Test (DT) is a drive test method that gathers, in a specifically selected route, test parameters, such as transmit power, received power, number of access failures and data throughput, by means of User Equipment (UE) in a test car. For the wireless network service providers, the major drawback of this method is the high cost.

An alternative method is that, instead of using specialized test car and UE, a user terminal in the existing network may be used to automatically upload network information, such as the drive test information, and the Mini Drive Test (MDT) of the drive test information. In the initial phase of network operation, the network service providers can gather from mobile subscribers a lot of needed network information such as drive test information (e.g., data on service fees and information about handover success rate) to evaluate the operation status of the whole network. The UE adopted by this method may be mobile phones or other terminals, such as data cards and netbooks. It is necessary to find a proper time for a UE to upload drive test information without affecting the ongoing use of the UE by the user and without consuming much energy of the UE.

The problem with the method of automatically uploading the drive test information by the UE based on existing technology is that: when there is ongoing service between a UE and a network side equipment, given the wireless network environment, uploading the needed network information, such as the drive test information, by the UE at the same time may cause the ongoing service of the UE to be interrupted and may cause unsatisfactory user experience with the UE. Further, no matter what way is adopted to upload data, the uploading will consume more energy of the UE, which will result in shorter standby time of the UE.

SUMMARY

Example embodiments of the present invention provide a method for uploading network information by using the power supply capacity of UE, and UE, network side equipment and system thereof, which avoids the problems of short standby time and the interruption of ongoing service for a user caused by uploading the network information.

For solving the technical problems, the following technical solutions are provided.

Example embodiments of the present invention provide a method for uploading network information comprising the following steps:

a network side equipment receives power supply capacity information reported by a UE; the network side equipment instructs the UE to upload network information according to the power supply capacity information; and the network side equipment receives the network information uploaded by the UE.

In above technical solution, instructing the UE to upload the network information according to the power supply capacity information comprises: if the network side equipment determines the UE is in charging status based on the power supply capacity information, the network side equipment instructs the UE to upload the network information.

In above technical solution, after instructing the UE to upload the network information according to the power supply capacity information, the network side equipment establishes a signaling service bearer with the UE.

In above technical solution, after receiving the network information, which is uploaded by the UE, the network side equipment releases the UE.

Example embodiments of the present invention provide another method for uploading network information comprising:

when in charging status, the UE reports the power supply capacity information to the network side equipment, and uploads the network information to the network side equipment according to an instruction of the network side equipment.

In above technical solution, uploading the network information to the network side equipment according to the instruction of the network side equipment comprises:

the UE receiving an instruction of uploading the network information, which is sent from the network side equipment, establishing signaling service bearer with the network side equipment, and uploading the network information to the network side equipment through the signaling service bearer.

In above technical solution, after uploading the network information to the network side equipment through the signaling service bearer, the method further comprises:

the UE freeing the memory occupied by the network information, and accepting release of the signaling service bearer from the network side equipment.

Example embodiments of the present invention further provide a network side equipment comprising a power capacity information receiving unit, an instruction unit and a network information receiving unit, wherein, the power capacity information receiving unit is configured to receive the power supply capacity information reported by the UE;

the instruction unit is configured to instruct the UE to upload the network information according to the power supply capacity information; and the network information receiving unit is configured to receive the network information uploaded by the UE.

In above solution, the instruction unit is specifically configured to determine whether the UE is in charging status based on the power supply capacity information, and if so, the instruction unit instructs the UE to upload the network information.

In above solution, the network side equipment further comprises a signaling service bearer establishing unit, which is configured to establish a signaling service bearer with the UE after the instruction unit instructs the UE to upload the network information.

In above solution, the network side equipment further comprises a signaling service bearer releasing unit, which is configured to release the UE after the network information receiving unit receives the network information uploaded by the UE.

Example embodiments of the present invention further provide a UE, comprising a power capacity information reporting unit and a network information uploading unit, wherein, the power capacity information reporting unit is configured to report the power supply capacity information to the network side equipment when the UE is in charging status; and the network information uploading unit is configured to upload the network information to the network side equipment according to the instruction of the network side equipment.

In above solution, the network information uploading unit comprises:

an instruction receiving subunit, which is configured to receive the instruction of uploading the network information, which is sent from the network side equipment;

a signaling service bearer establishing subunit, which is configured to establish signaling service bearer with the network side equipment;

a network information uploading subunit, which is configured to upload the network information to the network side equipment through the signaling service bearer.

In above solution, the network information uploading unit further comprises:

a memory freeing subunit, which is configured to free the memory occupied by the network information;

a signaling service bearer releasing subunit, which is configured to accept release of the service bearer from the network side equipment.

Example embodiments of the present invention further provide a communication testing system, comprising a UE and a network side equipment, wherein the UE is configured to, when in charging status, report the power supply capacity information to the network side equipment, and upload the network information to the network side equipment according to an instruction of the network side equipment;

the network side equipment is configured to receive the power supply capacity information reported by the UE, instruct the UE to upload the network information according to the power supply capacity information of the UE, and receive the network information uploaded by the UE.

In above solution, the network side equipment is further configured to establish signaling service bearer with the UE, and release the UE after receiving all the network information uploaded by the UE;

the UE is further configured to receive the instruction of uploading the network information, which is sent from the network side equipment, establish signaling service bearer with the network side equipment, and upload the network information to the network side equipment through the service bearer; and the UE is further configured to, after uploading all the network information to the network side equipment, free the memory occupied by the network information, and accept release of the service bearer from the network side equipment.

The technical solutions according to example embodiments of the present invention provide the following beneficial effect: the method for uploading network information by using the power supply capacity information of UE, and UE, network side equipment and system thereof, according to example embodiments of the present invention, avoid the problems of short standby time and the interruption of ongoing service for a user caused by uploading the network information, and reduce the operation cost, by uploading the network information according to the power supply capacity of the UE, for example, uploading the network information when the UE is in charging status.

Objectives and advantages related to the present invention will be illustrated in the subsequent descriptions and appended drawings.

DETAILED DESCRIPTION

In order to clearly illustrate the purpose, technical solutions, and advantages of the present invention, reference will now be made in detail to the embodiments of the present disclosure, examples of which are illustrated in the accompanying drawings. The descriptions represent below merely the preferred embodiment of the present invention, without any intention to limit the scope of the present invention thereto.

Figure 1:
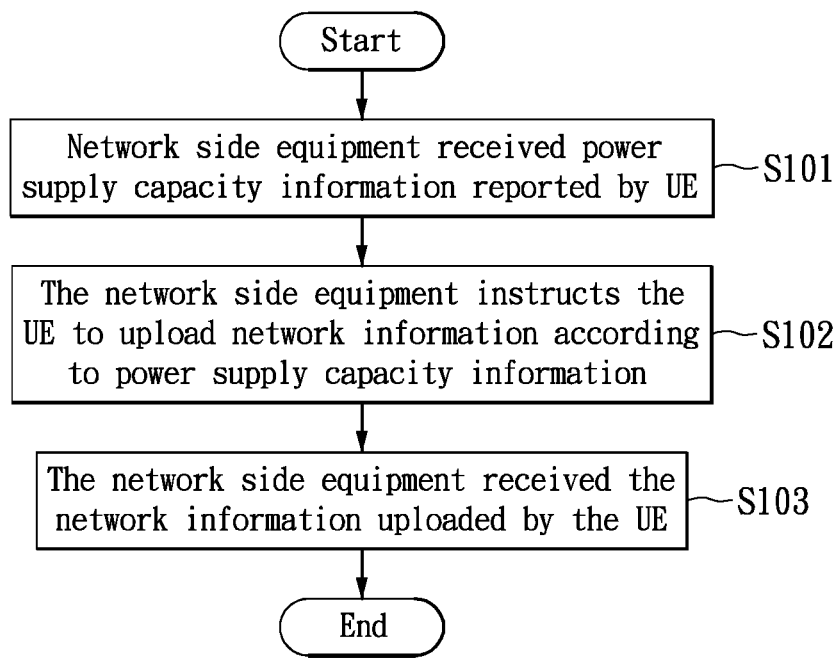
FIG. 1 shows a flowchart of a method provided by example embodiments of the present invention.

Example embodiments of the present invention provide a method for uploading network information. As shown in FIG. 1, the method comprises the following steps:

Step S101: the network side equipment receives power supply capacity information reported by the UE;

the UE can send messages, for example, a service request message, through a Non Access Stratum (NAS), and add optional Information Element (IE) in the reported system message to set reporting mode, for example, reporting periodically, or reporting within a specific period of time.

Step S102: the network side equipment instructs the UE to upload the network information according to the power supply capacity information.

Specifically, the network side equipment determines whether the power supply is in the charging status according to the power supply capacity information, and if so, instructs the UE to upload the network information; otherwise, the process of reporting the power supply capacity information is terminated.

Step S103: the network side equipment receives the network information uploaded by the UE.

When abnormal situations occur, for example, the charging status (usually external charging) is interrupted during the process of uploading network information, and battery capacity of the UE is not enough to transmit the rest of the information, the process of uploading the network information needs to be terminated.

The method provided by the example embodiments of the present invention avoids the problems of short standby time and the interruption of ongoing service for a user caused by uploading the network information, and reduces operation cost, by uploading the network information according to the power supply capacity of the UE (for example, uploading the network information when the UE is in charging status).

Figure 2:
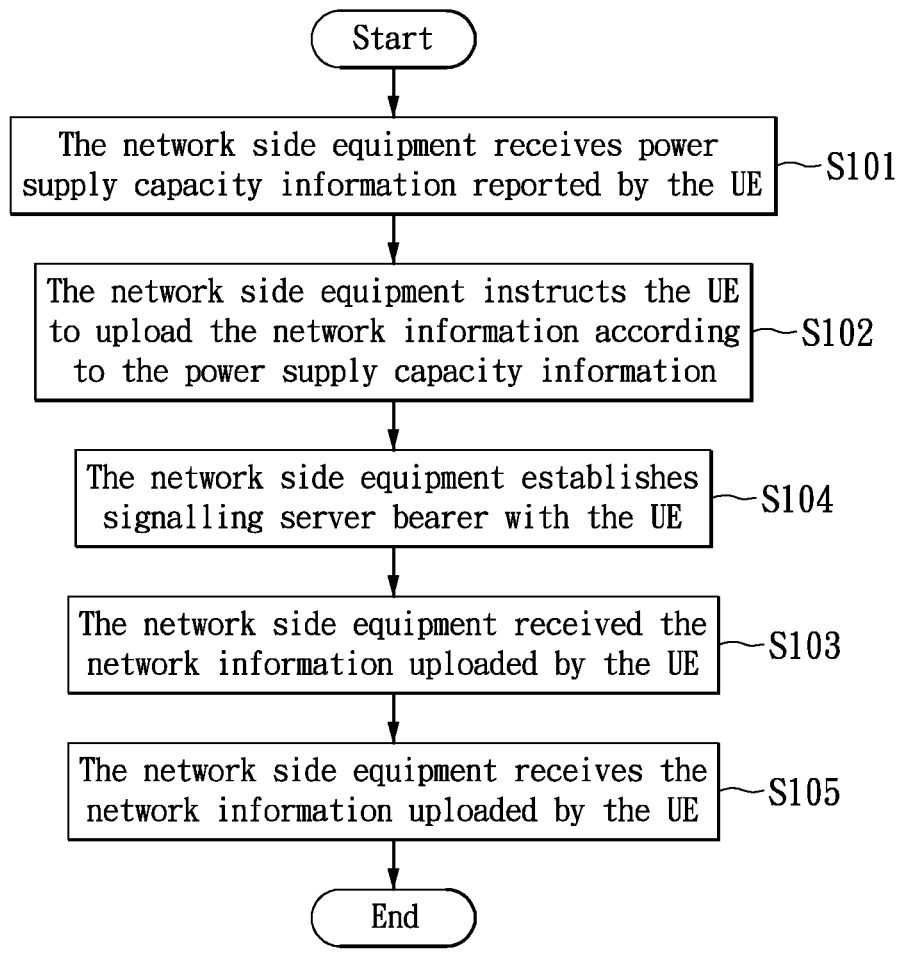
FIG. 2 shows a flowchart of another method provided by example embodiments of the present invention.

In another example embodiment, as shown in FIG. 2, after step S102, the method further comprises step S104: the network side equipment establishes a signaling service bearer with the UE. In addition, in this example embodiment, after step S103, the method further comprises step S105: the network side equipment releases the UE, so as to avoid unnecessary service bearing between the UE and the network side equipment.

Figure 3:
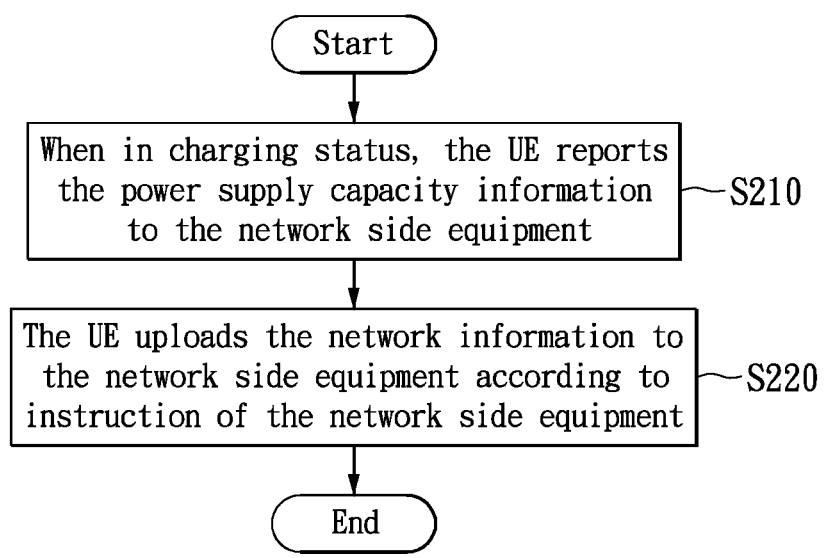
FIG. 3 shows another flowchart of a method provided by embodiment of the disclosure.
Figure 4:
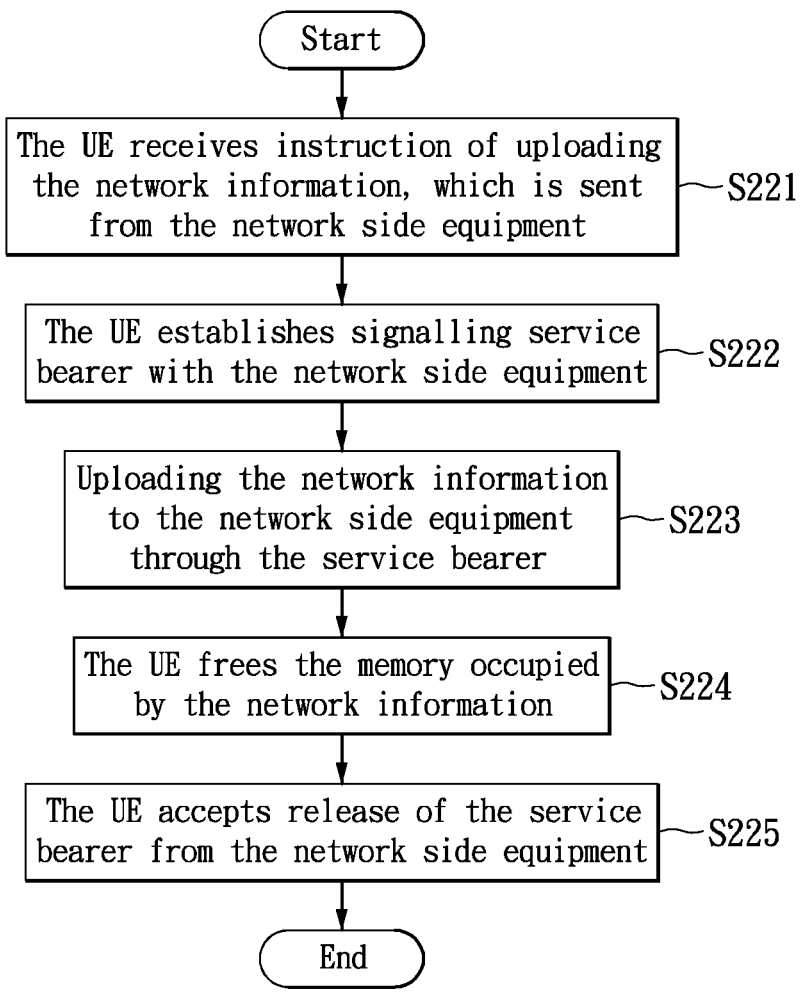
FIG. 4 shows a flowchart of Step 220 provided by example embodiments of the present invention.

The example embodiments of the present invention further provide another method for uploading network information; as shown in FIG. 3, the method comprises the following steps:

Step S210: when in charging status, the UE reports the power supply capacity information to the network side equipment;

Step S220: the UE uploads the network information to the network side equipment according to an instruction of the network side equipment. As shown in FIG. 4, step S220 specifically comprises the following steps:

Step S221: the UE receives an instruction of uploading the network information sent from the network side equipment;

Step S222: the UE establishes a signaling service bearer with the network side equipment;

Step S223: the UE uploads the network information to the network side equipment through the signaling service bearer.

Further, in this example embodiment, after step S223, the method further comprises the following steps:

Step S224: the UE frees the memory occupied by the network information;

Step S225: the UE accepts release of the signaling service bearer from the network side equipment.

The method provided by this example embodiment of the present invention avoids the problems of short standby time and the interruption of ongoing service for a user caused by uploading the network information, and reduces the operation cost, by uploading the network information according to the power supply capacity of the UE, for example, uploading the network information when the UE is in charging status.

The example embodiments of the above-mentioned method are described below.

EXAMPLE EMBODIMENT 1

The UE is in a Radio Resource Control_IDLE (RRC_IDLE) state.

Step 1: an upper layer (core processor) of the UE receives a report sent from a bottom layer (peripheral) of the UE that the UE is in charging status, and then instructs the UE to initiate a service request to the network side equipment, wherein the service request message includes the power supply capacity information of the UE;

Step 2: a core network receives the power supply capacity information of the UE, and evaluates the power supply capacity information;

Step 3: according to the result of evaluation, if the core network determines that the UE is in charging status, the core network instructs the UE to upload the network information, such as the drive test information; otherwise, the process jumps to Step 6;

Step 4: the UE receives the instruction of uploading the network information, such as the drive test information, and then establishes a signaling service bearer with the network side equipment;

Step 5: The UE uploads the network information, such as the drive test information, to the network side equipment through the signaling service bearer, and then frees the memory occupied by the network information, such as the drive test information. Then the core network releases the UE;

Step 6: The process ends.

EXAMPLE EMBODIMENT 2

The UE is in a Radio Resource Control_CONNECTED (RRC_CONNECTED) state.

Step 1: The upper layer of the UE receives a report sent from the bottom layer of the UE that the UE is in charging status, and then instructs the UE to initiate a bearer resource allocation request, wherein the bearer resource allocation request includes the power supply capacity information of the UE;

Step 2: the core network evaluates the received power supply capacity information of the UE;

Step 3: according to the result of evaluation, if the core network determines that the UE is in charging status, the core network instructs the UE to upload the network information, such as the drive test information; otherwise, process jumps to Step 6;

Step 4: The UE receives an instruction of uploading the network information, such as the drive test information, and then establishes specialized signaling service bearer with the network side equipment;

Step 5: The UE uploads the network information, such as the drive test information, to the network side equipment through the specialized signaling service bearer, and then frees the memory occupied by the network information, such as the drive test information. Then the core network releases the specialized signaling service bearer;

Step 6: The process ends.

EXAMPLE EMBODIMENT 3

The UE is in the RRC_CONNECTED state.

Step 1: The UE periodically reports the power supply capacity information;

Step 2: The core network evaluates the received power supply capacity information of the UE;

Step 3: According to the result of evaluation, the core network determines that the UE is in charging status, and instructs the UE to upload the network information, such as the drive test information, and initiates establishment of specialized signaling service bearer; otherwise, the process jumps to Step 6;

Step 4: The UE receives an instruction of uploading the network information, such as the drive test information, and then establishes specialized signaling service bearer with the network side equipment;

Step 5: The UE uploads the network information, such as the drive test information, to the network side equipment through the specialized signaling service bearer, and then frees the memory occupied by the network information, such as the drive test information. Then the core network releases the specialized signaling service bearer;

Step 6: The process ends.

EXAMPLE EMBODIMENT 4

The UE is in the RRC_IDLE state.

Step 1: The UE receives a paging message sent from the core network, wherein the paging message carries information that instructs the UE to report the power supply capacity;

Step 2: After receiving the paging message, the UE initiates a service request, wherein the service request includes the power supply capacity information of the UE;

Step 3: The core network evaluates the received power supply capacity information of the UE;

Step 4: According to the result of evaluation, the core network determines that the UE is in charging status, instructs the UE to upload the network information, such as the drive test information, and initiates establishment of specialized signaling service bearer; otherwise, the process jumps to Step 7;

Step 5: The UE receives an instruction of uploading the network information, such as the drive test information, and then establishes signaling service bearer with the network side equipment;

Step 6: The UE uploads the network information, such as the drive test information, to the network side equipment through the signaling service bearer, and then frees the memory occupied by the network information, such as the drive test information. Then the core network releases the UE;

Step 7: The process ends.

Figure 5:
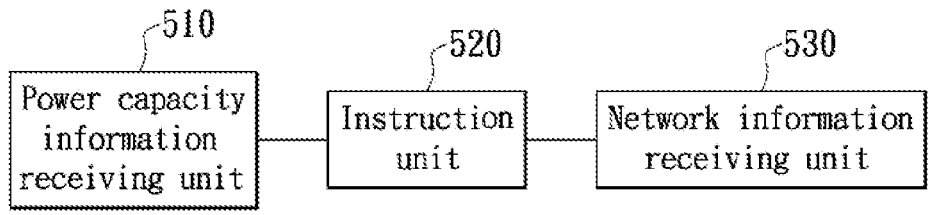
FIG. 5 shows a structure diagram of a network side equipment provided by example embodiments of the present invention.

As shown in FIG. 5, example embodiments of the present invention further provide a network side equipment, which comprises a power capacity information receiving unit 510, an instruction unit 520 and a network information receiving unit 530, wherein, the power capacity information receiving unit 510 is configured to receive the power supply capacity information reported by the UE;

the instruction unit 520 is configured to instruct the UE to upload the network information according to the power supply capacity information;

the network information receiving unit 530 is configured to receive the network information uploaded by the UE.

The instruction unit 520 is specifically configured to determine whether the power supply capacity information indicates that the UE is in charging status, and if so, instruct the UE to upload the network information. Otherwise, the process of reporting the power supply capacity information will be terminated.

Figure 6:
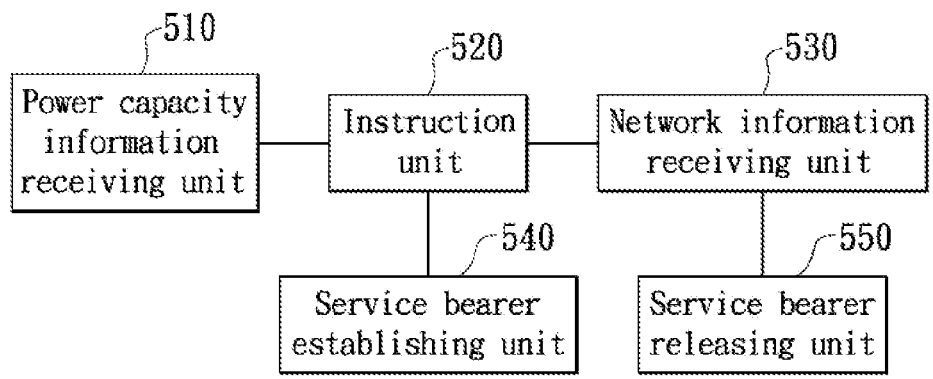
FIG. 6 shows another structure diagram of a network side equipment provided by example embodiments of the present invention.

In another example embodiment, as shown in FIG. 6, the network side equipment further comprises a service bearer establishing unit 540, which is configured to establish a signaling service bearer with the UE after the instruction unit 520 instructs the UE to upload the network information.

In another example embodiment, the network side equipment further comprises a bearer releasing unit 550, which is configured to release the UE after the network information receiving unit 530 receives the network information uploaded by the UE.

The network side equipment provided by this example embodiment of the present invention avoids the problems of short standby time and the interruption of ongoing service for a user caused by uploading the network information, and reduces the operation cost, by uploading the network information according to the power supply capacity of the UE, for example, uploading the network information when the UE is in charging status.

Figure 7:
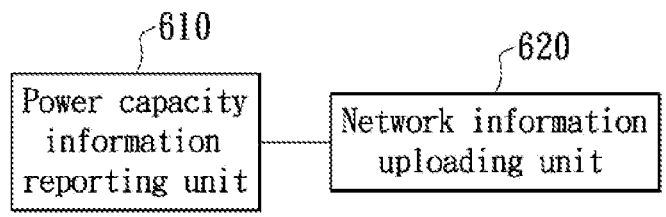
FIG. 7 shows a structure diagram of a UE provided by example embodiments of the present invention.

As shown in FIG. 7, this example embodiment of the present invention further provides a UE, which comprises a power capacity information reporting unit 610 and a network information uploading unit 620, wherein, the power capacity information reporting unit 610 is configured to report the power supply capacity information to the network side equipment when the UE is in charging state;

the network information uploading unit 620 is configured to upload the network information to the network side equipment according to an instruction of the network side equipment.

Figure 8:
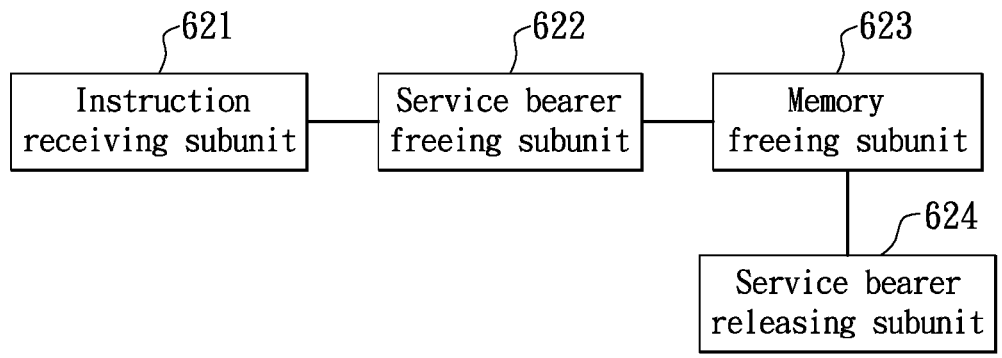
FIG. 8 shows a structure diagram of a network information uploading unit provided by example embodiments of the present invention.

As shown in FIG. 8, in an example embodiment, the network information uploading unit 620 further comprises:

an instruction receiving subunit 621, which is configured to receive the instruction of uploading the network information, which is sent from the network side equipment;

a service bearer establishing subunit 622, which is configured to establish signaling service bearer with the network side equipment;

a network information uploading subunit, which is configured to upload the network information to the network side equipment through the signaling service bearer.

As shown in FIG. 8, in another example embodiment, the network information uploading unit 620 further comprises:

a memory freeing subunit 623, which is configured to free the memory occupied by the network information;

a service releasing subunit 624, which is configured to accept release of the service bearer from the network side equipment.

The UE provided by this example embodiment of the present invention avoids the problems of short standby time and the interruption of ongoing service for a user caused by uploading the network information, and reduces the operation cost, by uploading the network information according to the power supply capacity of the UE, for example, uploading the network information when the UE is in charging status.

Figure 9:
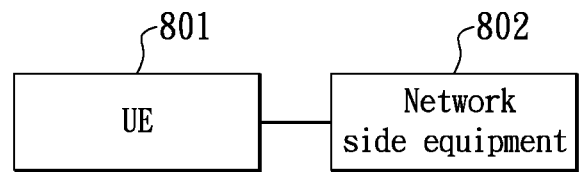
FIG. 9 shows a structure diagram of a communication testing system provided by example embodiments of the present invention.

As shown in FIG. 9, example embodiments of the present invention further provide a communication testing system, which comprises a UE 801 and a network side equipment 802, wherein, the UE 801 is configured to, when in charging status, report the power supply capacity information to the network side equipment 802, and upload the network information to the network side equipment 802 according to an instruction of the network side equipment 802;

the network side equipment 802 is configured to receive the power supply capacity information reported by the UE 801, instruct the UE 801 to upload the network information according to the power supply capacity information of the UE 801, and receive the network information uploaded by the UE 801.

In another example embodiment, the network side equipment 802 is further configured to establish signaling service bearer with the UE 801, and release the UE 801 after receiving all the network information uploaded by the UE 801;

the UE 801 is further configured to receive the instruction of uploading the network information sent from the network side equipment 802, establish a signaling service bearer with the network side equipment 802, and upload the network information to the network side equipment 802 through the signaling service bearer; the UE 801 is further configured to, after uploading all the network information to the network side equipment 802, free the memory occupied by the network information, and accept release of the service bearer from the network side equipment 802.

The system provided by this example embodiment of the present invention avoids the problems of short standby time and the interruption of ongoing service for a user caused by uploading the network information, and reduces the operation cost, by uploading the network information according to the power supply capacity of the UE, for example, uploading the network information when the UE is in charging status.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A method for uploading network information, comprising:
    receiving, by a network side equipment, power supply capacity information reported by a User Equipment (UE);
    instructing, by the network side equipment, the UE to upload network information according to the power supply capacity information;
    receiving, by the network side equipment, the network information uploaded by the UE; and
    establishing, by the network side equipment, a signaling service bearer with the UE.

2. The method according to claim 1, wherein instructing the UE to upload the network information according to the power supply capacity information comprises:
    if determined by the network side equipment that the UE is in charging status based on the power supply capacity information, instructing, by the network side equipment, the UE to upload the network information.

3. The method according to claim 1, further comprising after receiving the network information uploaded by the UE, releasing, by the network side equipment, the UE.

4. A method for uploading network information, comprising:
    reporting, by a User Equipment (UE), power supply capacity information of the UE to a network side equipment when the UE is in charging status; and
    uploading the network information to the network side equipment according to an instruction of the network side equipment;
    wherein uploading the network information to the network side equipment according to the instruction of the network side equipment comprises:
    receiving, by the UE, an instruction of uploading the network information sent from the network side equipment;
    establishing a signaling service bearer with the network side equipment; and
    uploading the network information to the network side equipment through the signaling service bearer.

5. The method according to claim 4, further comprising:
    after uploading the network information to the network side equipment through the signaling service bearer, freeing, by the UE, the memory occupied by the network information; and
    accepting release of the signaling service bearer from the network side equipment.

6. A network side equipment, comprising:
    a power capacity information receiving unit;
    an instruction unit; and
    a network information receiving unit, wherein,
    the power capacity information receiving unit is configured to receive power supply capacity information reported by a User Equipment (UE);
    the instruction unit is configured to instruct the UE to upload network information according to the power supply capacity information;
    the network information receiving unit is configured to receive the network information uploaded by the UE; and
    a signaling service bearer establishing unit, which is configured to establish a signaling service bearer with the UE after the instruction unit instructs the UE to upload the network information.

7. The network side equipment according to claim 6, wherein the instruction unit is specifically configured to determine whether the UE is in charging status based on the power supply capacity information, and if so, instruct the UE to upload the network information.

8. The network side equipment according to claim 6, further comprising a signaling service bearer releasing unit, which is configured to release the UE after the network information receiving unit receives the network information uploaded by the UE.

9. A User Equipment (UE), comprising:
    a power capacity information reporting unit; and
    a network information uploading unit, wherein,
    the power capacity information reporting unit is configured to report power supply capacity information of the UE to a network side equipment when the UE is in charging state; and
    the network information uploading unit is configured to upload network information to the network side equipment according to an instruction of the network side equipment;
    wherein the network information uploading unit comprises:
    an instruction receiving subunit, which is configured to receive an instruction of uploading the network information sent from the network side equipment;
    a service bearer establishing subunit, which is configured to establish a signaling service bearer with the network side equipment; and
    a network information uploading subunit, which is configured to upload the network information to the network side equipment through the signaling service bearer.

10. The UE according to claim 9, wherein the network information uploading unit further comprises:
    a memory freeing subunit, which is configured to free the memory occupied by the network information; and
    a service releasing subunit, which is configured to accept release of the signaling service bearer from the network side equipment.

11. A communication testing system, comprising:
    a User Equipment (UE); and
    a network side equipment, wherein
    the UE is configured to, when in charging status, report power supply capacity information to the network side equipment, and upload network information to the network side equipment according to an instruction of the network side equipment;
    the network side equipment is configured to receive the power supply capacity information reported by the UE, instruct the UE to upload the network information according to the power supply capacity information of the UE, and receive the network information uploaded by the UE;

the network side equipment is further configured to establish a signaling service bearer with the UE, and release the UE after receiving all the network information uploaded by the UE; and the UE is further configured to receive an instruction of uploading the network information sent from the network side equipment, establish a signaling service bearer with the network side equipment, and upload the network information to the network side equipment through the signaling service bearer; and is further configured to, after uploading all the network information to the network side equipment, free the memory occupied by the network information, and accept release of the service bearer from the network side equipment.

\* \* \* \* \*